(12) United States Patent
Song et al.

(10) Patent No.: US 11,511,696 B2
(45) Date of Patent: *Nov. 29, 2022

(54) DRIVER AIRBAG DEVICE FOR VEHICLE

(71) Applicant: HYUNDAI MOBIS CO., LTD., Seoul (KR)

(72) Inventors: Min June Song, Seoul (KR); Seok Hoon Ko, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/395,835

(22) Filed: Aug. 6, 2021

(65) Prior Publication Data

US 2022/0063541 A1 Mar. 3, 2022

(30) Foreign Application Priority Data

Aug. 26, 2020 (KR) .......................... 10-2020-0108103

(51) Int. Cl.
```
B60R 21/203    (2006.01)
B60R 21/2346   (2011.01)
B60R 21/2165   (2011.01)
B60R 21/233    (2006.01)
B60R 21/239    (2006.01)
```
(52) U.S. Cl.
CPC ........ *B60R 21/2037* (2013.01); *B60R 21/203* (2013.01); *B60R 21/21656* (2013.01); *B60R 21/233* (2013.01); *B60R 21/239* (2013.01); *B60R 21/2346* (2013.01); *B60R 2021/23324* (2013.01)

(58) Field of Classification Search
CPC ................ B60R 21/203; B60R 21/215; B60R 21/21656; B60R 21/2346; B60R 21/2165; B60R 21/2035; B60R 21/2037; B60R 21/2176; B60R 21/205; B60R 21/2155; B60R 21/216; B60R 21/261; B60R 21/2334; B60R 11/0229; B60R 11/0235; B60R 11/0258; B60R 11/0264; B60R 2011/001; B60R 2011/005; B60R 2021/23566; B60R 2021/161; B60R 2021/2173
USPC .................................. 280/728.2, 731, 728.3
See application file for complete search history.

(56) References Cited

FOREIGN PATENT DOCUMENTS

| | | | | |
|---|---|---|---|---|
| DE | 19911682 A1 | * | 9/2000 | ............. B60R 21/05 |
| KR | 20120044831 A | | 5/2012 | |
| WO | WO-2020260364 A1 | * | 12/2020 | ........... B60R 21/203 |

* cited by examiner

*Primary Examiner* — Keith J Frisby
(74) *Attorney, Agent, or Firm* — NovoTechIP International PLLC (57) ABSTRACT

Provided is a driver airbag device for a vehicle deploying to the front of a steering wheel while avoiding an obstacle in the rear of the steering wheel on which the obstacle is positioned at a center portion, the driver airbag device comprising an airbag cushion deploying to the front of the steering wheel by passing between the obstacle and the steering wheel when gas is injected inside; a gas injection device positioned under the airbag cushion to inject gas into the airbag cushion through a gas outlet; and a diffuser positioned inside the airbag cushion and configured to partially or entirely cover the gas outlet from above to deploy by the gas injected through the gas outlet and induce the gas to flow to an opening opened toward the front of the steering wheel.

14 Claims, 8 Drawing Sheets

DRIVER AIRBAG DEVICE FOR VEHICLE

CROSS-REFERENCE TO RELATED APPLICATIONS

The present application claims priority to Korean Patent Application No. 10-2020-0108103, filed Aug. 26, 2020, the entire contents of which is incorporated herein for all purposes by this reference.

BACKGROUND OF THE INVENTION

1. Field of the Invention

The present invention relates to a driver airbag device for a vehicle, and more particularly, to a driver airbag device for a vehicle deploying to a front of a steering wheel to which a display device is coupled at a center portion.

2. Discussion of Related Art

As a measure to secure the safety of vehicle passengers, various types of airbag devices are provided in vehicles, and among them, a driver airbag device is mounted on a steering wheel.

The driver airbag device is configured such that when an inflator explodes after receiving a control signal from an airbag control unit, an upper body of a driver is protected by a deployed airbag cushion as the airbag cushion is deployed to the driver while protruding from a steering wheel toward the driver by the pressure of the airbag gas injected from the inflator.

On the other hand, if the autonomous driving by which a vehicle finds a way to a destination without direct operation of the steering wheel, accelerator pedal, and brake by a driver is widely implemented, the driver may select a relaxed mode in which the driver may rest without personally engaging in driving while the vehicle travels, and a display device may be provided on the steering wheel for a comfortable rest of the driver in the relaxed mode.

It should be noted that the driver airbag cushion needs to protrude to the front of the display device for deployment toward the driver. If the airbag cushion damages the display device during deployment, there was a problem in that the driver may be injured by the scattered display device.

In order to solve the problem described above, configurations have been developed for deploying the airbag cushion while avoiding the display device, but deploying the airbag cushion in the desired direction had been an issue.

The matters described above as the technical background are intended only for a better understanding of the background of the present invention and should not be taken as an acknowledgment that they pertain to the conventional art already known to those skilled in the art.

BRIEF SUMMARY OF THE INVENTION

The present invention is proposed to address the issue described above and, it is an object of the present invention to provide an airbag device deploying to a front of a steering wheel by inducing a direction of the gas, generated from an inflator, inside the airbag cushion.

To accomplish the above objects, according to the one aspect of the present invention, there is provided a driver airbag device for a vehicle deploying to the front of the steering wheel while avoiding an obstacle in the rear of the steering wheel on which the obstacle is positioned at the center portion includes an airbag cushion deploying to the front of the steering wheel by passing between the obstacle and the steering wheel to deploy to the front of the steering wheel when gas is injected thereto; a gas ejection device positioned under the airbag cushion to inject gas into the airbag cushion through a gas outlet; and a diffuser positioned within the airbag cushion and configured to at least partially cover the gas outlet from above to deploy by the gas injected through the gas outlet and direct the flow of the gas to an opening opened toward the front of the steering wheel.

The obstacle positioned at the center portion of the steering wheel may be a display device disposed to face the front of the driver.

The airbag cushion may be housed within an airbag housing positioned in the rear of the obstacle in the front-rear direction of the steering wheel and may deploy to the front of the steering wheel through the opening opened upward of the airbag housing at the time of deployment.

In the diffuser, portions of a panel extending in a planar direction are coupled to each other in an overlapping state in the up-down direction to form an inner space in which gas flows through the overlapping panels at the time of deployment.

The panels overlapping each other in the up-down direction may be spaced apart from each other to form an open inner space so that an opening of the diffuser may be formed.

The diffuser may include a first folding portion folded so that one-end portion may at least partially cover the gas outlet while overlapping a main portion in an up-down direction and coupled to the main portion overlapped at each side-end portion in a folded state.

The first folding portion may be positioned at a front end portion of the diffuser in the front-rear direction of the steering wheel.

The diffuser may include a second folding portion folded so that the-other-end portion overlaps the main portion in the up-down direction and coupled to the main portion respectively overlapped at each side-end portion in a folded state.

The second folding portion may be positioned at a rear end portion of the diffuser in the front-rear direction of the steering wheel.

The end portions of the first folding portion and the second folding portion may be disposed to be spaced apart from each other, and an opening may be formed between the spaced first folding portion and the second folding portion spaced apart when the diffuser deploys.

The first folding portion may extend to a length where the end portion is positioned at a height corresponding to an upper end portion of the obstacle in a deploying state.

The second folding portion may extend to a length where the end portion bends toward the front of the steering wheel above the upper end of the obstacle in the deploying state.

A flow hole formed through the panel may be formed in the first folding portion or the second folding portion, and the gas flowing in the inner space between the first folding portion or the second folding portion and the main portion may be guided to flow out through the flow hole.

The first folding portion or the second folding portion may be coupled to the airbag cushion to simultaneously deploy as the airbag cushion deploys.

The second folding portion may be coupled to the rear of the airbag cushion, and the coupling position may be above the upper end portion of the obstacle when the second folding portion and the airbag cushion are in a deploying state.

DETAILED DESCRIPTION OF THE INVENTION

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the present invention may be modified in various ways and have various embodiments, specific embodiments will be illustrated in the drawings and described. However, this is not intended to limit the present invention to the specific embodiments and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention. The term and/or includes a combination of a plurality of related items listed or an item among a plurality of related items listed.

When a component is referred to as being "connected" or "coupled" to another component, it may be directly connected or coupled to another component, but it should be understood that other components may exist in between. On the other hand, when a component is referred to as being "directly connected" or "directly coupled" to another component, there are no intervening components present. Other expressions describing the relationship between components such as "between" and "just between", or "adjacent to" and "directly adjacent to" should be interpreted in the same manner.

The terminology used herein is for the purpose of describing particular embodiments only and is not intended to be limiting of the invention. Singular expressions include plural expressions unless the context explicitly indicates otherwise. In the present specification, terms such as "comprise" or "have" are intended to designate the presence of implemented features, integers, steps, operations, components, parts, or combinations thereof and should not be understood to preclude the presence or additional possibilities of one or more of other features, integers, steps, operations, components, parts or combinations thereof in advance.

Unless otherwise defined, all terms used herein, including technical or scientific terms, have the same meanings as are generally understood by one of ordinary skill in the art. It will be further understood that terms, such as those defined in commonly used dictionaries, should be interpreted as having a meaning that is consistent with their meaning in the context of the present application, and will not be interpreted in an idealized or overly formal sense unless expressly so defined herein.

Hereinafter, the present invention will be described in detail by describing preferred embodiments of the present invention with reference to the drawings. The same reference numerals presented in each drawing represent the same members.

Figure 1:
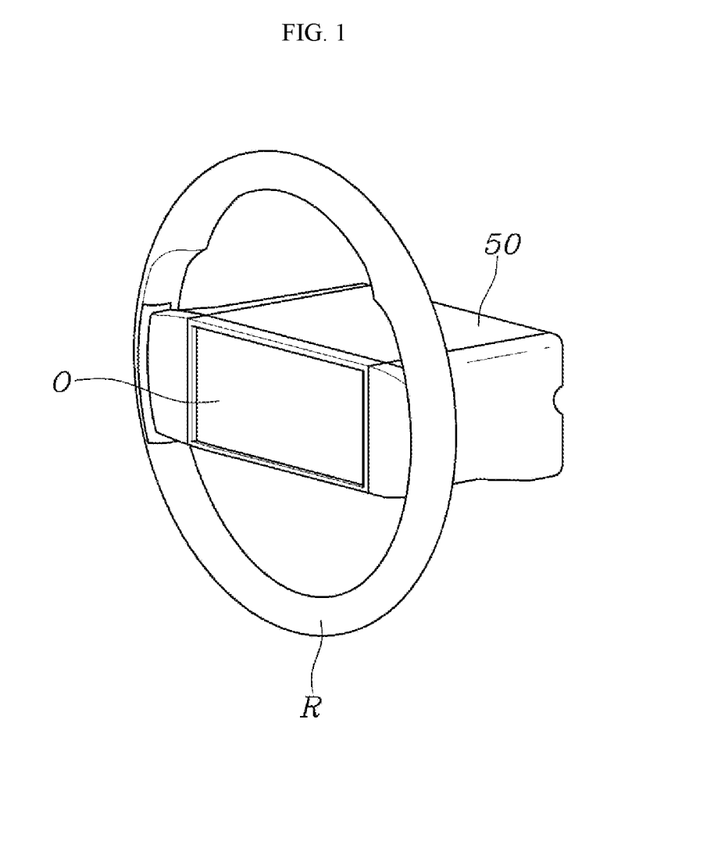
FIG. 1 is a perspective view showing a steering wheel equipped with a driver airbag for a vehicle according to an embodiment of the present invention.
Figure 2:
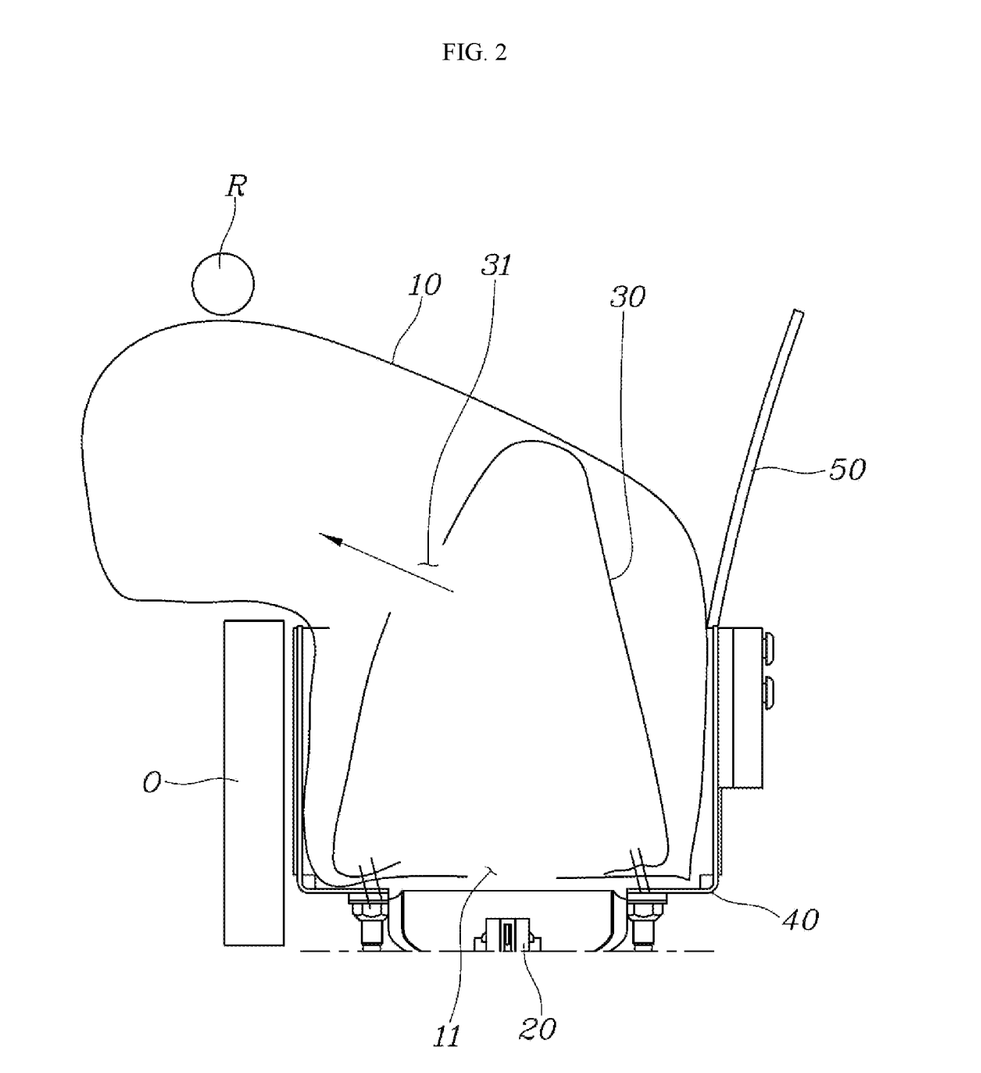
FIG. 2 is a cross-sectional view of a steering wheel equipped with a driver airbag for a vehicle according to an embodiment of the present invention.

FIG. 1 is a perspective view showing a steering wheel R equipped with a driver airbag for a vehicle according to an embodiment of the present invention, and FIG. 2 is a cross-sectional view of a steering wheel R equipped with a driver airbag for a vehicle according to an embodiment of the present invention.

FIGS. 1 and 2 show a driver airbag for a vehicle according to an embodiment of the present invention comprising an airbag cushion 10 deploying to the front of a steering wheel by passing between an obstacle O and the steering wheel R when gas is injected thereto; a gas injection device 20 positioned under the airbag cushion 10 to inject gas into the airbag cushion 10 through a gas outlet 11; and a diffuser 30 positioned within the airbag cushion 10 and configured to at least partially cover a gas outlet 11 from above to deploy by the gas injected through the gas outlet 11 and direct the flow of the gas to an opening 31 opened toward the front of the steering wheel R, in a driver airbag device deploying to the front of the steering wheel R while avoiding the obstacle O in the rear of the steering wheel R on which the obstacle is positioned at the center portion.

The steering wheel R may refer as a rim coupled to the obstacle O to surround the obstacle O positioned at the center portion from outside. In addition, as described below, a steering housing (not shown) fixed to the steering wheel R may be coupled in the rear of the steering wheel R.

The obstacle O is positioned at the center portion of the steering wheel R, and the airbag cushion 10 positioned in the rear of the steering wheel R may deploy to the front of the steering wheel R while avoiding the obstacle O. Accordingly, the deployment pressure of the airbag cushion 10 is prevented from being applied to the obstacle O so that damage to the obstacle or subsequent scattering of the damaged obstacle may be prevented.

The obstacle O positioned at the center portion of the steering wheel R may be a display device disposed to face the front of the driver.

The display device may be a screen display device for infotainment of the driver or may display a screen showing a vehicle state, navigation, or the like.

According to another embodiment, the obstacle O may be an emblem or an emblem equipped with a lighting device mounted on the steering wheel R.

The gas injection device 20 may be connected to the airbag cushion 10 through the gas outlet 11 to inject the gas into the airbag cushion 10. In an embodiment, the gas injection device 20 may be an inflator that ejects gas when a signal is input. The gas injection device 20 may be coupled to an airbag housing 40 to be described below, and in particular, may be positioned under the airbag cushion 10.

The diffuser 30 may guide the flow of the gas injected into the airbag cushion 10 through the gas outlet 11 within the airbag cushion 10. Specifically, the diffuser 30 may at least partially cover the gas outlet 11 from above and guide the flowing direction of the gas flowing upward through the gas outlet 11 toward the front of the steering wheel R.

In particular, an inner space may be formed in the diffuser 30, and the gas flowing into the inner space through the gas outlet 11 may be led to the opening 31 opened toward the front of the steering wheel R.

Such diffuser 30 has the effect of inducing the airbag cushion 10 to rotatably deploy to the front of the steering wheel R in the airbag cushion 10.

The airbag cushion 10 may be housed in the airbag housing 40 positioned in the rear of the obstacle O in the front-rear direction of the steering wheel R and deploy to the front of the steering wheel R through the opening 31 opened upward of the airbag housing at the time of deployment.

The airbag housing 40 may be mounted in the rear of the steering wheel R. In particular, the steering housing (not shown) may be fixed to the steering wheel R in the rear of the steering wheel R, and the airbag housing 40 may be coupled to the steering housing (not shown) to be mounted in the rear of the steering wheel R. In particular, the airbag housing 40 may be positioned in the rear of the obstacle O provided at the center portion of the steering wheel R.

The airbag housing 40 may be a container with an opening 31 formed at an upper portion in an embodiment or a cuboid with the top side removed in another embodiment.

The airbag cushion 10 may be housed in the airbag housing 40 and may deploy to the front of the steering wheel R by passing between the obstacle O and the steering wheel R when the gas is injected thereto. In particular, the airbag cushion 10 may deploy outside the airbag housing 40 through the opening 31 of the airbag housing 40.

The housing cover 50 may cover the opening 31 of the airbag housing 40. In an embodiment, the opening 31 of the airbag housing 40 may be formed on the top side of the airbag housing 40 and the housing cover 50 may cover the top side of the airbag housing 40 from above.

Deployment pressure of the airbag cushion 10 is generated when gas is injected into the airbag cushion 10, and the housing cover may be damaged by the deployment pressure to open the opening 31 of the airbag housing.

The housing cover 50 may have a tear line along which the housing cover is torn by the deployment pressure of the airbag cushion 10.

The tear line may be a line along which the housing cover 50 is led to be torn apart by the deployment pressure generated in the airbag cushion 10 housed in the airbag housing 40 and applied upward to the housing cover 50.

The housing cover 40 may be rotated while being torn apart along the tear line by the deployment pressure so that a front end portion of the torn part may move upward.

Specifically, the tear line may extend laterally from the front end portion of the housing cover 50 and may extend in the front-rear direction at either side-end portion.

Figure 3:
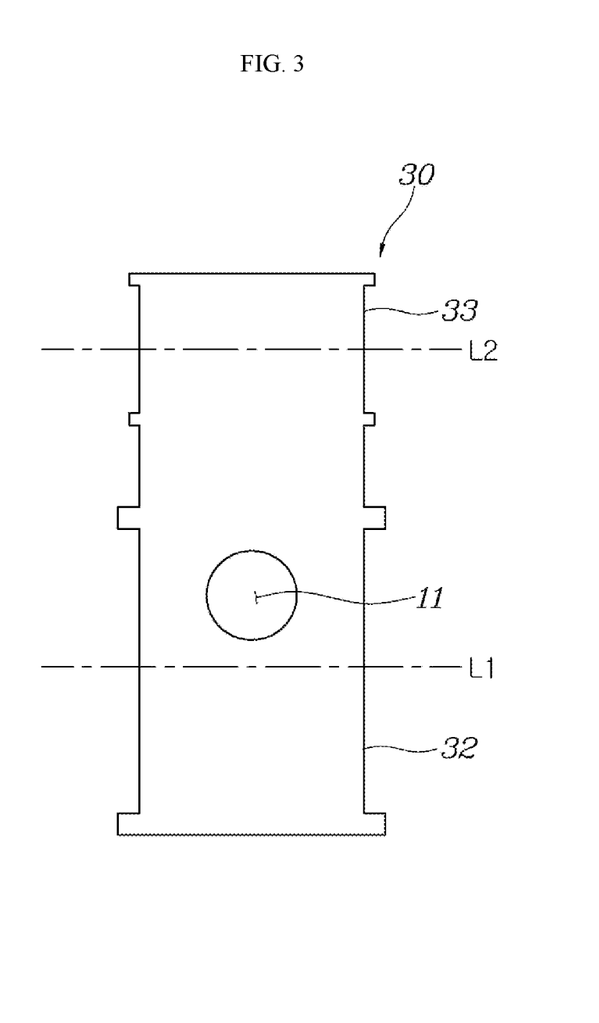
FIG. 3 is a plan view showing a diffuser prior to being folded according to an embodiment of the present invention.
Figure 4:
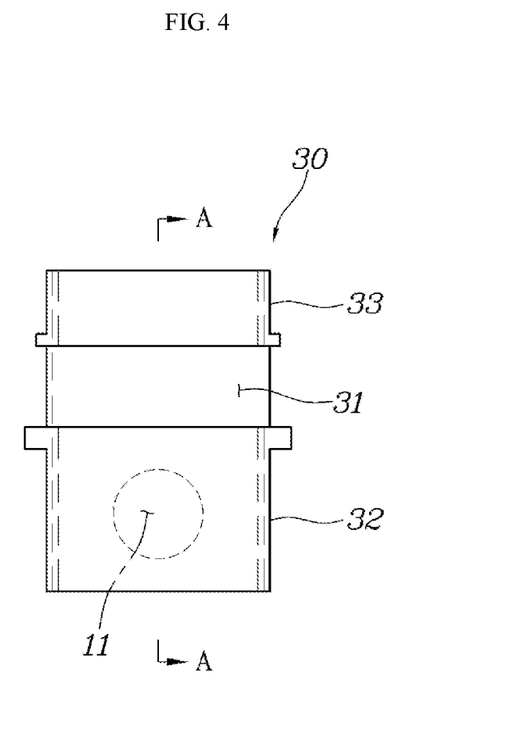
FIG. 4 is a plan view showing a diffuser in a folded state according to an embodiment of the present invention.
Figure 5:
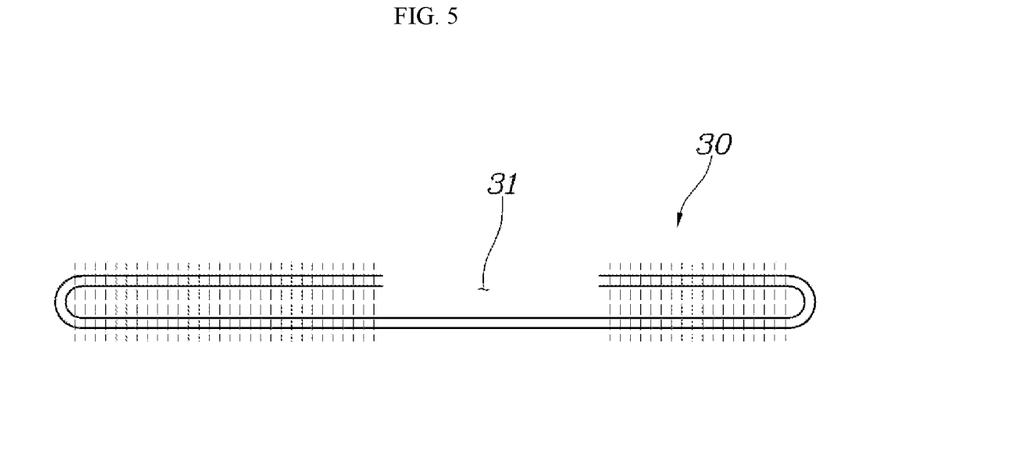
FIG. 5 is a cross-sectional view of the diffuser in FIG. 4 taken along line A-A.

FIG. 3 is a plan view showing the diffuser 30 prior to being folded according to an embodiment of the present invention, FIG. 4 is a plan view showing the diffuser 30 in a folded state according to an embodiment of the present invention, and FIG. 5 is a cross-sectional view of diffuser in FIG. 4 taken along line A-A.

FIGS. 3 to 5 further show that, in the diffuser 30, a panel extending in the planar direction shown in FIG. 3 may turn into an overlapping shape as shown in FIGS. 4 and 5 to form an inner space into which gas may flow at the time of deployment.

Specifically, in the diffuser 30, portions of the panel extending in the planar direction may be coupled to each other in an overlapping state in the up-down direction, so that an inner space in which gas flows between the overlapping portions of the panel at the time of deployment may be formed. In other words, the panel may be folded to form a bottom layer and a top layer vertically overlapping the bottom layer. An inner space may be formed between the top and bottom layers, and the gas injected to the diffuser 30 may flow through the inner space.

In an embodiment, the panels overlapping each other in the up-down direction may be coupled to each other at each side-end portion to form an inner space in the diffuser 30. That is, the diffuser 30 may be an envelope-like shape with one side opened by panels respectively coupled at either side-end portion while overlapping each other.

When the diffuser 30 deploys as gas is injected into the inner space, the inner space may be formed as the panels are spaced apart from each other at the center portion where the panels are spaced inward from either side-end portion while being fixed at either side-end portion where the panels are fixedly coupled to each other.

In particular, the panels overlapping each other in the up-down direction are spaced apart from each other to form an open inner space so that an opening 31 may be formed in the diffuser 30.

More specifically, the diffuser 30 may include a first folding portion 32 and a second folding portion 33. The first folding portion 32 and the second folding portion 33 may be positioned at opposite end portions, and each may be folded inward.

In particular, the first folding portion 32 may be folded backward along the first folding line L1 and the second folding portion 33 may be folded forward along the second folding line L2. The overlapping position when the panel is folded may be marked on the panel, in an embodiment, or the folding lines may be marked separately on the panel in another embodiment.

The diffuser 30 may include a first folding portion 32 folded so that one-end portion may at least partially cover the gas outlet 11 from above while overlapping the main portion in the up-down direction and coupled to the main portion respectively overlapped at either side-end portion in the folded state.

The first folding portion 32 may entirely cover the gas outlet 11 from above or partially cover the gas outlet 11 from above. In particular, the folding portion 32 may cover half or more of the gas outlet 11 from above. Accordingly, the first folding portion 32 may guide the flow of the gas flowing in w % bile deploying by the gas flowing in through the gas outlet 11.

In particular, the first folding portion 32 may be positioned at the front end portion of the diffuser 30 in the front-rear direction of the steering wheel R.

The diffuser 30 may include a second folding portion 33 folded so that the-other-end portion may overlap the main portion in the up-down direction and be coupled to the main portion overlapped at either side-end portion respectively in a folded state.

The second folding portion 33 may be positioned at the rear end portion of the diffuser 30 in the front-rear direction of the steering wheel R.

The end portions of the first folding portion 32 and the second folding portion 33 may be disposed to be spaced apart from each other, and the opening 31 may be formed between the first folding portion 32 and the second folding portion 33 spaced apart from each other when the diffuser 30 deploys.

The opening 31 may be formed in a region where the panels constituting the diffuser 30 do not overlap. In particular, the opening 31 is formed between the end portion of the first folding portion 32 and the end portion of the second folding portion 33 so that the inner space formed by the first folding portion 32 and the second folding portion 33 may be opened by the opening 31.

The first folding portion 32 may extend to a length where the end portion is positioned as high as the upper end portion of the obstacle in the deploying state.

The first folding portion 32 positioned at the front end portion of the diffuser 30 in the front-rear direction of the steering wheel R may extend to a length where the end portion is positioned as high as the upper end portion of the obstacle R so that the inner space may expand as high as the upper end portion of the obstacle O in the rear of the obstacle O.

In addition, the second folding portion 33 may extend to a length where the end portion bends toward the front of the steering wheel R above the end portion of the obstacle O in the deploying state.

The second folding portion 33 positioned at the rear end portion of the diffuser 30 in the front-rear direction of the steering wheel R may extend to a length where the end portion bends toward the front of the steering wheel R above the end portion of the obstacle O so that the inner space may expand to the front of the steering wheel R while expanding higher than the upper end portion of the obstacle O in the rear of the obstacle O.

Accordingly, the opening 31 formed between the end portion of the first folding portion 32 and the end portion of the second folding portion 33 spaced apart from each other faces toward the front of the steering wheel R, and thus, the gas in the inner space of the first folding portion 32 and the second folding portion 33 may be led to the front of the steering wheel R.

Figure 6:
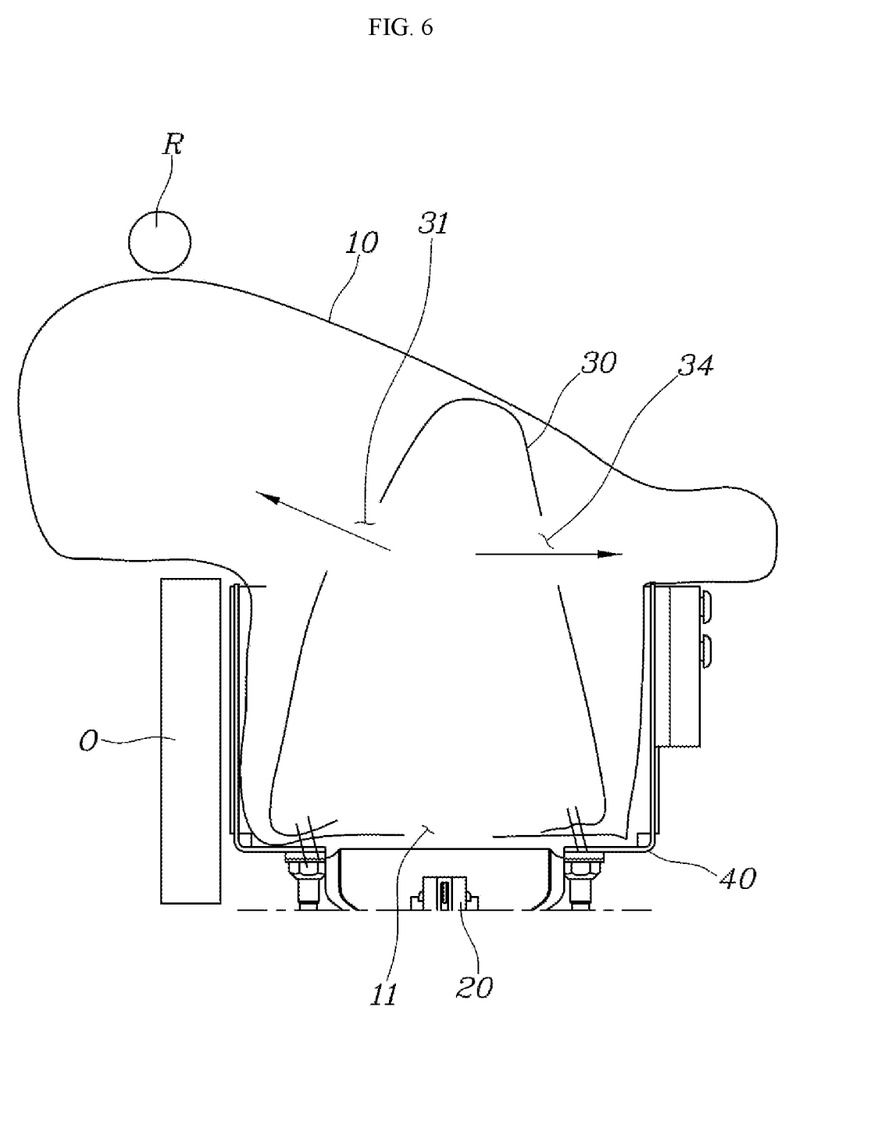
FIG. 6 is a cross-sectional view of a steering wheel equipped with a driver airbag for a vehicle according to another embodiment of the present invention.
Figure 7:
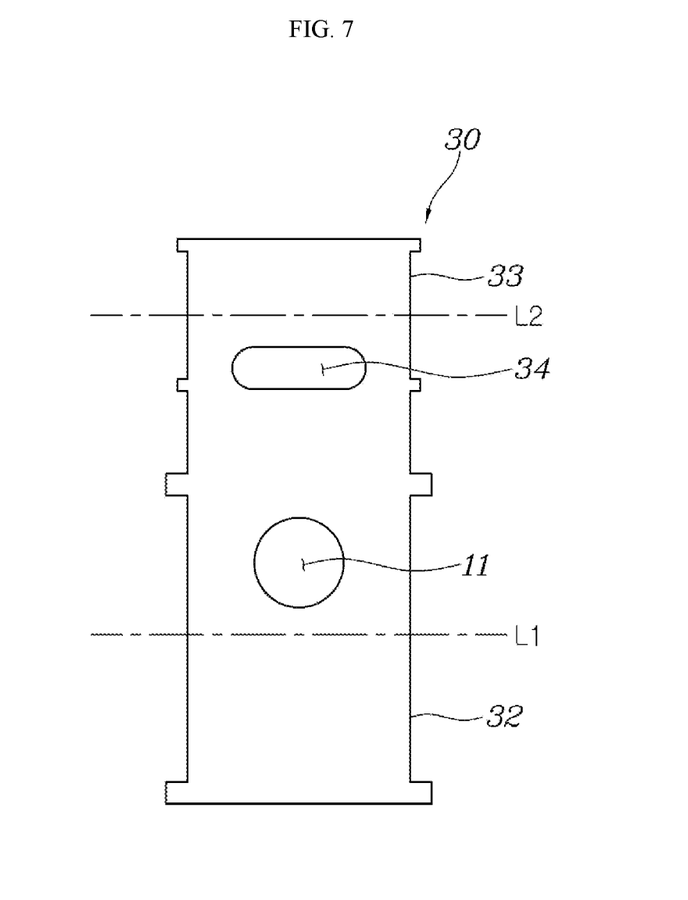
FIG. 7 is a plan view showing a diffuser prior to being folded according to another embodiment of the present invention.
Figure 8:
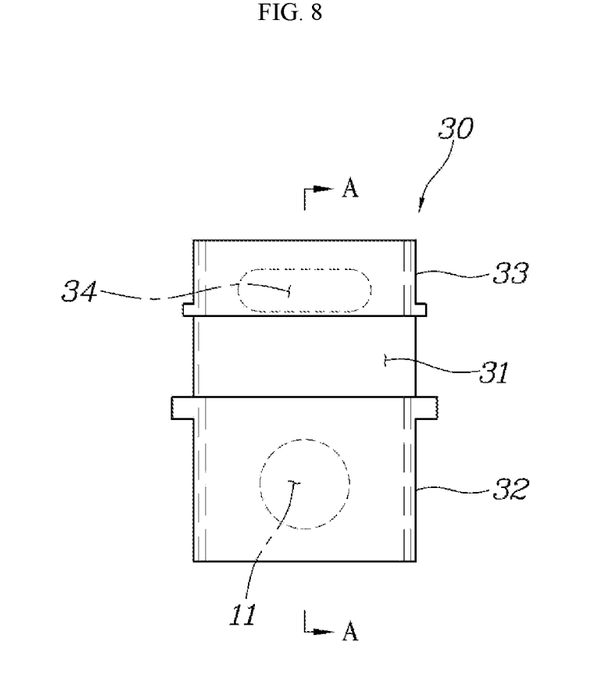
FIG. 8 is a plan view of another diffuser in a folded state according to another embodiment of the present embodiment.

FIG. 6 is a longitudinal view of the steering wheel R equipped with a driver airbag according to another embodiment of the present invention, FIG. 7 is a plan view showing the diffuser 30 prior to being folded according to another embodiment of the present invention, and FIG. 8 is a plan view of the diffuser 30 in a folded state according to another embodiment of the present invention.

FIGS. 6 to 8 show that a flow hole 34 formed through the panel may be formed in the first folding portion 32 or the second folding portion 33, and the gas flowing in the inner space between the first folding portion 32 or the second folding portion 33 and the main portion may be guided to flow out through the flow hole 34.

As shown in the drawings, the flow hole 34 according to an embodiment may be formed in the second folding portion 33. Accordingly, the gas flowing into the inner space of the second folding portion 33 may flow out through the flow hole. In particular, the flow hole 34 may be formed in the second folding portion 33 formed at the rear end portion of the diffuser 30 in the rear-front direction of the steering wheel R so that the gas may be discharged to the rear of the steering wheel R.

Thus, the airbag cushion 10 may deploy rearward as the gas flows out to the rear of the steering wheel R through the flow hole 34 of the second folding portion 33.

In an embodiment, the airbag cushion 10 deploying rearward may collide with the airbag housing or a steering housing (not shown) to which the airbag housing is fixed so that a rotational force rotating forward may be generated in a reaction.

Figure 9:
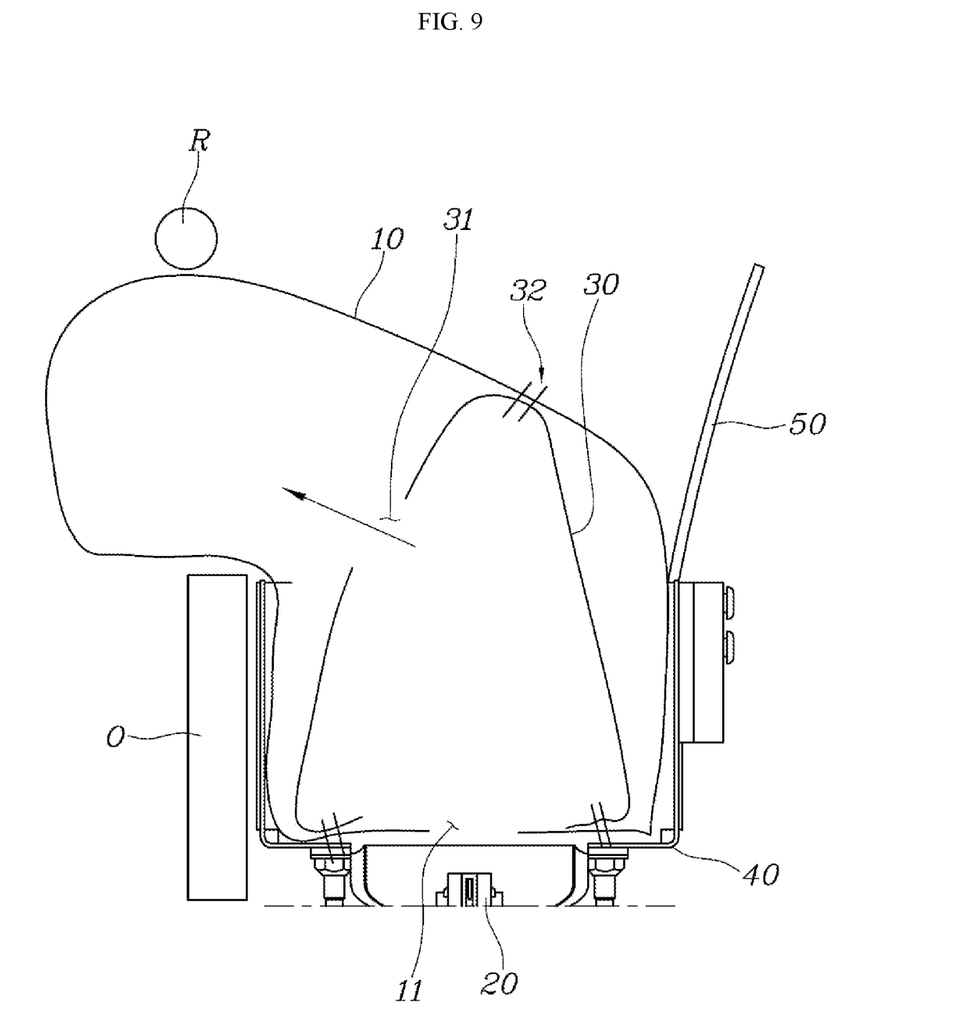
FIG. 9 is a cross-sectional view of a steering wheel equipped with a driver airbag for a vehicle according to still another embodiment of the present invention.

FIG. 9 is a longitudinal view of the steering wheel R equipped with the driver airbag according to still another embodiment of the present invention.

FIG. 9 further shows that the first folding portion 32 or the second folding portion 33 may be coupled to the airbag cushion 10 to simultaneously deploy as the airbag cushion 10 deploys.

According to an embodiment, the first folding portion 32 or the second folding portion 33 may deploy by the gas flowing in through the gas outlet 11 positioned under the airbag cushion 10.

According to another embodiment, the first folding portion 32 and the second folding portion 33 may be respectively coupled to the airbag cushion 10 to simultaneously deploy as the airbag cushion 10 deploys.

In particular, the end portion of the first folding portion 32 may be coupled to the front of the airbag cushion 10 from the main portion in the right and left directions.

The second folding portion 33 may be coupled to the rear of the airbag cushion 10, and the coupling position may be above the upper end portion of the obstacle O when the second folding portion 33 and the airbag cushion 10 are in the deploying state.

Specifically, the second folding portion 33 may be coupled to the rear of the airbag cushion 10 from the main portion in the right and left directions. In particular, the second folding portion 33 may be coupled to the rear of the airbag cushion 10 at a position spaced inward from the end portion.

The second folding portion 33 may extend above the upper end portion of the obstacle O in the deploying state, bend forward above the upper end portion of the obstacle O. and extend to the position where the end portion of the second folding portion 33 bends forward above the upper end portion of the obstacle O. The second folding portion 33 may be coupled to the rear of the airbag cushion 10 at a position spaced inward from the end portion. The second folding portion 33 may bend downward again at the coupling position to be at the highest position at the coupling position.

Specific embodiments of the present invention are illustrated and described, but it will be self-evident to those with common knowledge in the related art that the present invention may be improved upon and modified in various ways within the scope not departing from the technical spirit of the present invention provided by the patent claims below.

According to the driver airbag device for a vehicle of the present invention, the airbag cushion induces to avoid the display device and deploy so that damage to the display device is prevented and the safety of passengers may improve.

In addition, the driver airbag device has the effect of inducing the airbag cushion to rotatably deploy to the front of the steering wheel.

What is claimed is:

1. A driver airbag for a vehicle positioned at a rear of a steering wheel and configured to deploy toward a front of the steering wheel while avoiding an obstacle positioned at a center portion of the steering wheel, the driver airbag comprising:
    an airbag cushion configured to deploy toward the front of the steering wheel through a space between the obstacle and the steering wheel when gas is injected into the airbag cushion;
    a gas injection device positioned under the airbag cushion and configured to inject the gas into the airbag cushion through a gas outlet; and
    a diffuser positioned within the airbag cushion, at least partially covering the gas outlet and having an opening formed toward the front of the steering wheel,
    wherein, when the gas is injected to the diffuser through the gas outlet, the diffuser directs the injected gas to flow toward the opening,
    wherein the diffuser comprises a panel folded to form a bottom layer and a top layer overlapping the bottom layer with an inner space therebetween, and
    wherein the gas flows toward the opening through the inner space when the gas is injected to the diffuser.

2. The driver airbag of claim 1, wherein the obstacle comprises a display device facing a driver.

3. The driver airbag of claim 1, wherein the airbag cushion is housed within an airbag housing positioned in the rear of the obstacle and having an opening facing upward.

4. The driver airbag of claim 1, wherein the panel is folded at both sides to form first and second top layers overlapping the bottom layer, the first and second top layers being horizontally spaced apart from each other to form the opening therebetween exposing the inner space.

5. A driver airbag for a vehicle positioned at a rear of a steering wheel and configured to deploy toward a front of the steering wheel while avoiding an obstacle positioned at a center portion of the steering wheel, the driver airbag comprising:
    an airbag cushion configured to deploy toward the front of the steering wheel through a space between the obstacle and the steering wheel when gas is injected into the airbag cushion;
    a gas injection device positioned under the airbag cushion and configured to inject the gas into the airbag cushion through a gas outlet; and
    a diffuser positioned within the airbag cushion, at least partially covering the gas outlet and having an opening formed toward the front of the steering wheel,
    wherein, when the gas is injected to the diffuser through the gas outlet, the diffuser directs the injected gas to flow toward the opening,
    wherein the diffuser includes:
        a main portion having first and second sides facing each other; and
        a first folding portion extending from the first side of the main portion and overlapping the main portion to at least partially cover a portion of the main portion connected to the gas outlet.

6. The driver airbag of claim 5, wherein the first folding portion is positioned at a front portion of the diffuser.

7. The driver airbag of claim 5, wherein the diffuser further includes a second folding portion extending from the second side of the main portion and overlapping the main portion.

8. The driver airbag of claim 7, wherein the second folding portion is positioned at a rear end portion of the diffuser.

9. The driver airbag of claim 7, wherein the first and second folding portions are horizontally spaced apart from each other to form the opening therebetween.

10. The driver airbag of claim 7, wherein, when the diffuser is deployed, the first folding portion vertically extends as high as an upper end of the obstacle.

11. The driver airbag of claim 7, wherein, when the diffuser is deployed, the second folding portion vertically extends above an upper end of the obstacle and then bends toward the front of the steering wheel.

12. The driver airbag of claim 11, wherein the second folding portion is coupled to a coupling point of the airbag cushion, the coupling point being above the upper end of the obstacle when the diffuser is deployed.

13. The driver airbag of claim 7, wherein the diffuser further comprises a flow hole formed at one of the first and second folding portions.

14. The driver airbag of claim 7, wherein the first or second folding portion is coupled to the airbag cushion such that the diffuser is deployed when the airbag cushion deploys.

* * * * *